United States Patent

Trongeau

[15] 3,690,423
[45] Sept. 12, 1972

[54] COMBINATION SILASTIC AND FRICTION SHOCK ABSORBER

[72] Inventor: William J. Trongeau, Chicago, Ill.
[73] Assignee: Miner Enterprises, Inc., Chicago, Ill.
[22] Filed: March 31, 1971
[21] Appl. No.: 129,704

[52] U.S. Cl. ................. 188/271, 188/268, 188/317
[51] Int. Cl. .......................... F16f 9/30, F16f 11/00
[58] Field of Search ...... 188/268, 271, 279, 280, 316, 188/317, 298; 213/22

[56] References Cited

UNITED STATES PATENTS

| | | | |
|---|---|---|---|
| 2,199,145 | 4/1940 | Watson | 188/268 |
| 3,397,798 | 8/1968 | Carlson | 188/268 |

*Primary Examiner*—George E. A. Halvosa
*Attorney*—Edward F. Jurow and Clifford A. Dean

[57] ABSTRACT

A friction shock absorber having a thin wall cylinder filled with compressible solid, an outer sleeve fitted over and slidably engaging the thin wall cylinder, with the wall thickness of the outer sleeve being approximately three times greater than the wall thickness of the thin wall cylinder, and a piston rod extending into the thin walled cylinder having a piston head in engagement with the inner surface of the cylinder, with the piston head being provided with a multiplicity of axially disposed orifices. When subject to relatively high impact forces, the wall of the cylinder expands radially into tighter frictional engagement with the wall of the outer sleeve and a peripheral orifice is thus obtained for additional throttling of the compressible solid, thereby increasing the shock dissipating capacity of the shock absorber.

6 Claims, 6 Drawing Figures

PATENTED SEP 12 1972

WILLIAM J. TRONGEAU INVENTOR.

BY Edward L. Jason

ATTY 3,690,423

COMBINATION SILASTIC AND FRICTION SHOCK ABSORBER

BACKGROUND AND OBJECTS OF THE INVENTION

1. Field of the Invention

A piston-type friction shock absorber using a compressible solid as a dampening medium.

2. Description of the Prior Art

The prior art discloses the use of piston-type shock absorbers using a compressible solid as a dampening medium wherein on impact the compressible solid is metered through a fixed number of orifices in the piston head. The art does not disclose a piston-type shock absorber which upon application of relatively high impact force will create an additional peripheral orifice for the metering of a compressible solid, thereby increasing its capacity to absorb shock.

OBJECTS OF THE INVENTION

The principal object of this invention is to provide a piston-type shock absorber which when subjected to high impact loads will increase its shock dissipating capacity by developing a peripheral orifice in addition to the axial orifices provided in the piston head for the throttling of a compressible solid.

SUMMARY OF THE INVENTION

A friction shock absorber which has a thin walled cylinder filled with a compressible solid and over which is positioned an outer sleeve which is in slidable engagement with the thin walled cylinder, with the wall thickness of the outer sleeve, as compared to the wall thickness of the thin walled cylinder, being in the ratio of approximately 3 to 1. Extending into the thin walled cylinder is a piston rod having a piston head located at one extremity thereof and provided with a plurality of axial orifices. Located at the other extremity of the piston rod is an enlarged portion which threadably engages an open end of the outer sleeve. Under low pressure conditions the piston head will be in surface to surface slidable engagement with the thin walled cylinder but under high pressure conditions the comparatively thin wall of the thin walled cylinder expands radially and forms a peripheral orifice defined by the outer edge of the piston head and the inside surface of the thin walled cylinder. Under low pressure conditions the compressible solid will be throttled through the axial orifices in the piston head but under high pressure conditions compressible solid will be throttled not only through the axial orifices in the piston head but also through the additional peripheral orifice created by the expansion of the side wall of the thin walled cylinder, thereby increasing the shock mitigating properties of the shock absorber under high impact loads.

DESCRIPTION OF THE PREFERRED EMBODIMENT

Figure 1:
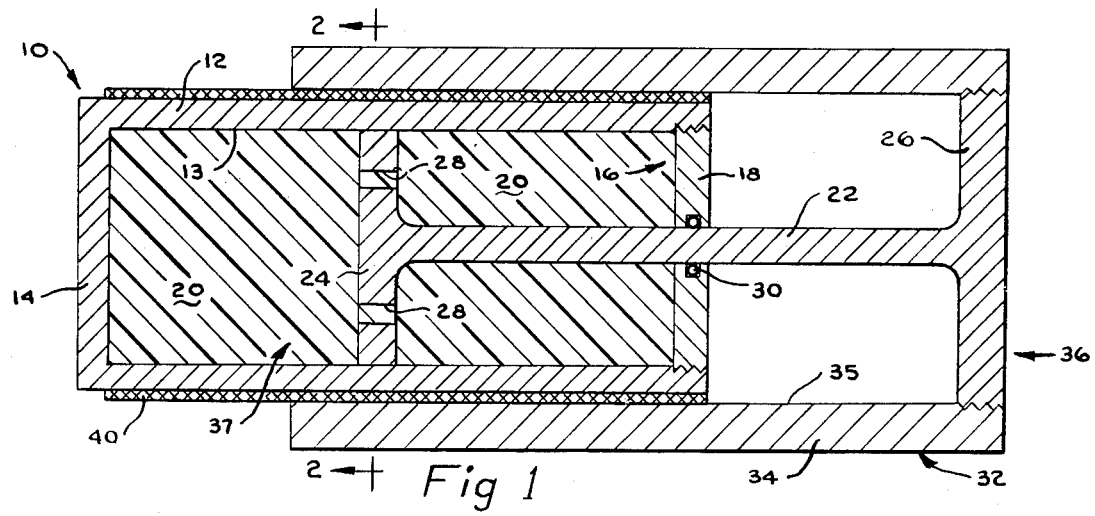
FIG. 1 is a longitudinal section view of a preferred embodiment of the invention.
Figure 2:
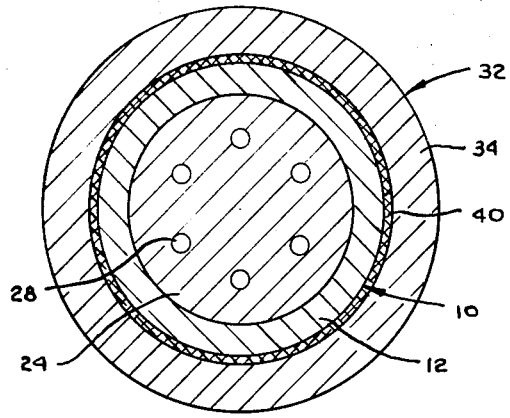
FIG. 2 is a transverse section view taken along the line 2—2 in FIG. 1 showing the invention upon application of low impact forces.
Figure 3:
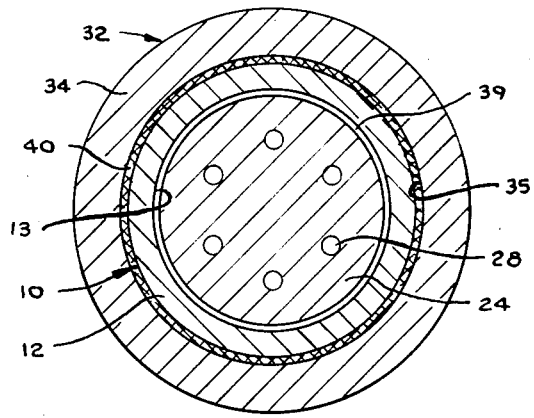
FIG. 3 is a transverse section view taken along the line 3—3 in FIG. 4 showing the invention upon application of high impact forces.
Figure 4:
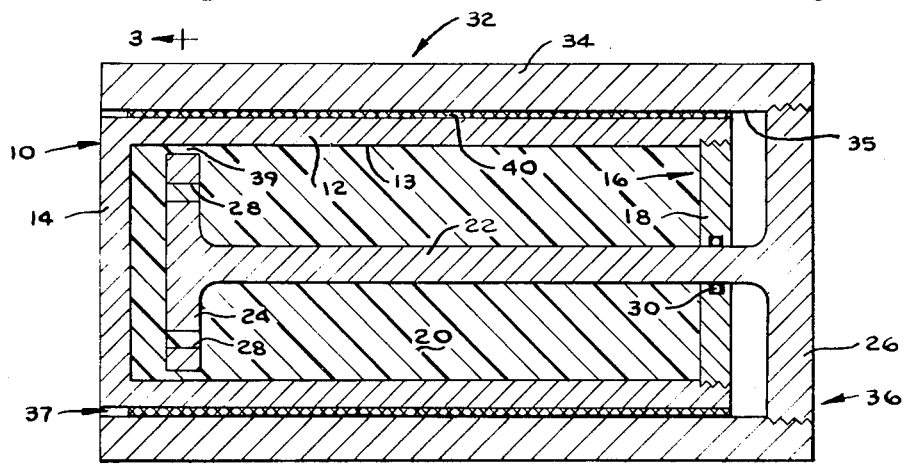
FIG. 4 is a longitudinal section view of the embodiment of FIG. 1 in its fully closed position.

Referring now to the drawings for a better understanding of the invention, a thin walled cylinder 10 has side wall 12, which has friction surface 13, and end wall 14, an open end 16 and is filled with a compressible solid 20. An enclosure 18 is secured into the open end 16 of the thin wall cylinder 10 and together with sealing means 30 accommodates reciprocating passage of a piston rod 22 which is provided with a piston head 24 at one extremity which has one or more axial orifices 28 therethrough and which terminates into an enlarged portion 26.

An outer sleeve 32 has side wall 34 which has friction surfaces 35 and open ends 36 and 37 with the thickness of side walls 34 of outside sleeve 32 being in the ratio of 3 to 1 as compared to the thickness of side wall 12 of thin wall cylinder 10. The outer sleeve 32 fits over the thin wall cylinder 10 with the relatively thick side wall 34 having friction surface 35 being telescopically slidable in surface to surface friction engagement with friction surfaces 13 of relatively thin side wall 12 of thin wall cylinder 10. Enlarged portion 26 of piston rod 22 is secured into the open end 36 of outside sleeve 32.

Under low pressure conditions the piston head 24 will be in surface to surface slidable engagement with friction surface 13 of side wall 12 of thin wall cylinder 10 and compressible solid 20 will pass through the axial orifices 28 of piston head 24.

Under relatively high pressure conditions such as encountered during the closure of the shock absorber the relatively thin side walls 12 expand radially into tighter frictional engagement with the side walls 34 of outside sleeve 32 and form a peripheral orifice 39 between the outside edge of piston head 24 and the inside surface of side walls 12 for passage of compressible solid 20.

Under high pressure conditions the peripheral orifice 39 constitutes an additional passage for throttling of compressible solid 20 over and beyond that provided by axial orifices 28, therefore increasing the shock dissipating capacity of high impact forces. Under relatively high impact forces maximum friction is generated due to the radial expansion of relatively thin side wall 12 of thin wall cylinder 10 whereas when subjected to low impact forces friction dissipation is at a minimum because the lack of any appreciable radial expansion of side wall 12.

In order to provide long life for the friction surface 13 of side wall 12 of thin wall cylinder 10 and friction surface 35 of side wall 34 of outer sleeve 32, a layer of friction material 40 such as brake shoe lining is deposited on either friction surface 13 of side wall 12 or the friction surface 35 of side wall 34.

Figure 5:
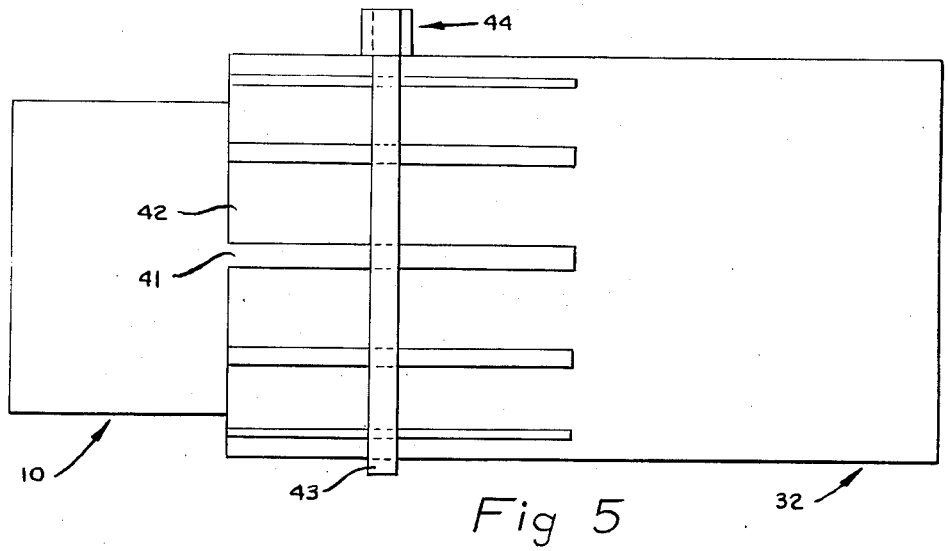
FIG. 5 is a side elevation view of a second embodiment of the invention.
Figure 6:
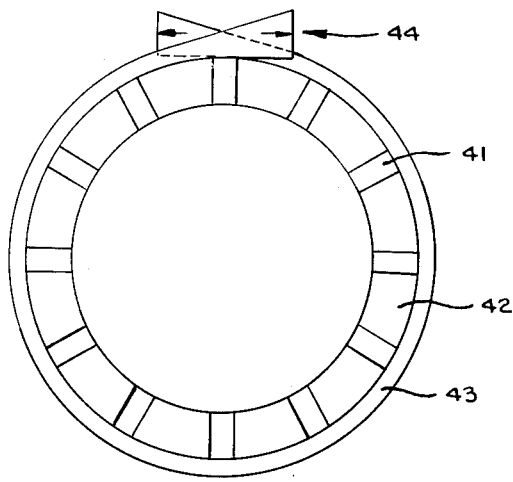
FIG. 6 is an end view of the embodiment of the invention as illustrated in FIG. 5.

If positive means for selectively controlling the initial friction between thin walled cylinder 10 and outer sleeve 32 are desired, a multiplicity of longitudinally disposed slots 41 defining fingers 42, are provided at one end of outer sleeve 32 as illustrated in FIGS. 5 and 6. A band 43 with related clamping mechanism 44 encircles sleeve 32 and is adjustably tightened to provide uniform radial pressure on fingers 42 so that fingers 42 are in frictional engagement with thin walled cylinder 10.

In view of the above it will be seen that the object of the invention is achieved and other advantageous results attained.

As various changes could be made in the above construction without departing from the scope of the invention, it is intended that all matter contained in the above description or shown in the accompanying drawings will be interpreted as illustrative and not in a limiting sense.

I claim:

1. A friction shock absorber comprising:
  a. a thin walled cylinder having a radially expandable side wall, and end wall and an open end;
  b. an end closure threaded into said open end of said thin walled cylinder;
  c. a compressible solid contained within said thin walled cylinder;
  d. a piston rod extending through an opening provided in said end closure into said thin walled cylinder and having a piston head at one extremity with one or more axially disposed orifices, said piston rod terminating into an enlarged portion at the other extremity;
  e. sealing means to seal said piston rod relative to said opening in said end closure;
  f. an outer sleeve having a side wall and open ends, said enlarged portion of said piston rod secured to close one of said open ends of said outer sleeve, said outer sleeve telescopically slidable over and in engagement with said thin walled cylinder; and
  g. said side wall of said thin walled cylinder expanding under high pressure to provide a peripheral orifice between the edge of said piston head and said side wall of said thin walled cylinder thereby increasing the shock dissipating capacity of said friction shock absorber and increasing the frictional engagement between the side wall of said sleeve and thin walled cylinder.

2. A friction shock absorber as defined in claim 1 having means to protect the friction surfaces between said thin walled cylinder and said outer sleeve.

3. A friction shock absorber as defined in claim 2 wherein said means for protecting the friction surfaces between said thin walled cylinder and said outside sleeve includes a layer of replaceable friction material deposited on the outside surface of said side wall of said thin walled cylinder so that friction engagement between said thin walled cylinder and said outer sleeve will be maintained but with a minimum of surface wear resulting from friction engagement of said thin walled cylinder with said outer sleeve.

4. A friction shock absorber as defined in claim 2 wherein said means for protecting the friction surfaces between said thin walled cylinder and said outer sleeve includes a layer of friction material deposited on the inside surface of said side wall of said outer sleeve so that friction engagement between said thin walled cylinder and said outer sleeve will be maintained but with a minimum of surface wear resulting from friction engagement of said thin walled cylinder with said outer sleeve.

5. A friction shock absorber as defined in claim 1 having means to selectively control the initial friction between said outer sleeve and said thin walled cylinder.

6. A friction shock absorber as defined in claim 5 wherein said means to selectively control the initial friction between said outer sleeve and said thin walled cylinder includes a multiplicity of longitudinally disposed slots forming a series of circumferentially disposed fingers at one end of the outer sleeve and adjustable means for exerting uniform radial pressure on said fingers so that tight frictional engagement is maintained between said outer sleeve and said thin walled cylinder.

* * * * *